United States Patent [19]

Kanamaru

[11] Patent Number: 4,634,853
[45] Date of Patent: Jan. 6, 1987

[54] OPTICAL INFORMATION READING APPARATUS

[75] Inventor: Hitoshi Kanamaru, Saitama, Japan

[73] Assignee: Pioneer Electronic Corporation, Japan

[21] Appl. No.: 604,246

[22] Filed: Apr. 26, 1984

[30] Foreign Application Priority Data

Apr. 27, 1983 [JP] Japan .............................. 58-63397[U]

[51] Int. Cl.$^4$ ........................... G01J 1/20; G11B 21/10
[52] U.S. Cl. ....................................... 250/201; 369/44
[58] Field of Search ......................... 250/201 DF, 204; 369/44, 45, 46

[56] References Cited

U.S. PATENT DOCUMENTS 4,381,557 4/1983 Jebens .......................... 250/201 DF

FOREIGN PATENT DOCUMENTS 186237 11/1982 Japan .
179954 11/1982 Japan .

Primary Examiner—Gene Wan
Attorney, Agent, or Firm—Sughrue, Mion, Zinn, Macpeak, and Seas

[57] ABSTRACT

An optical information recording apparatus for reading information recorded on an optically recorded disk in which perpendicularity is maintained between the recording plane of the disk and the optical axis of a reading light beam independently of the operation of a focus servo system. To detect the amount of offset in perpendicularity between the optical axis of the reading light beam and the recording surface, a light-emitting element and a light-detecting element are provided. In accordance with the invention, the path between the light-emitting element and the light-detecting element does not pass through a lens which focuses the reading beam onto the plane of the recording medium.

10 Claims, 20 Drawing Figures

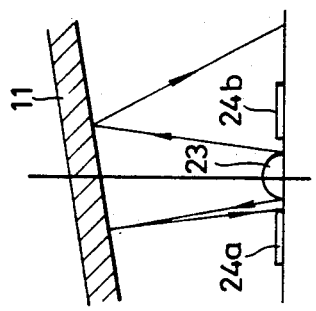
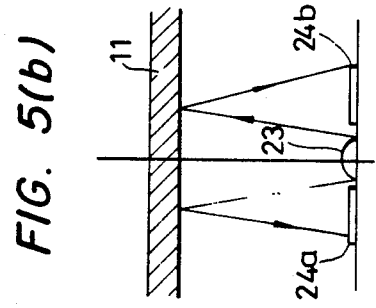
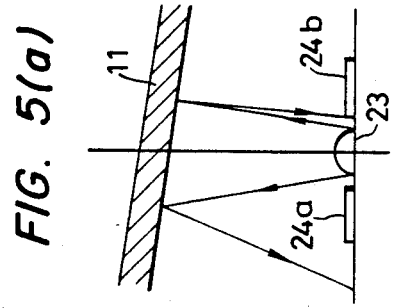
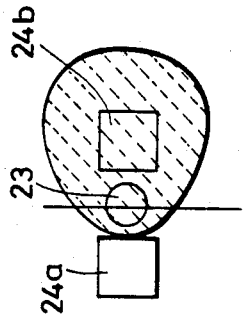
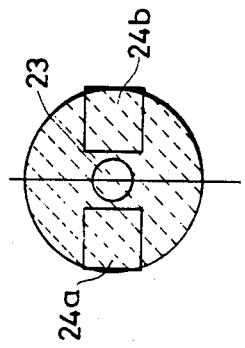
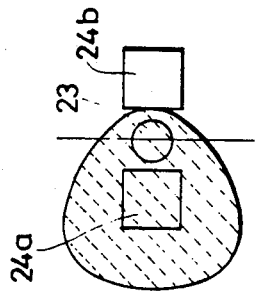

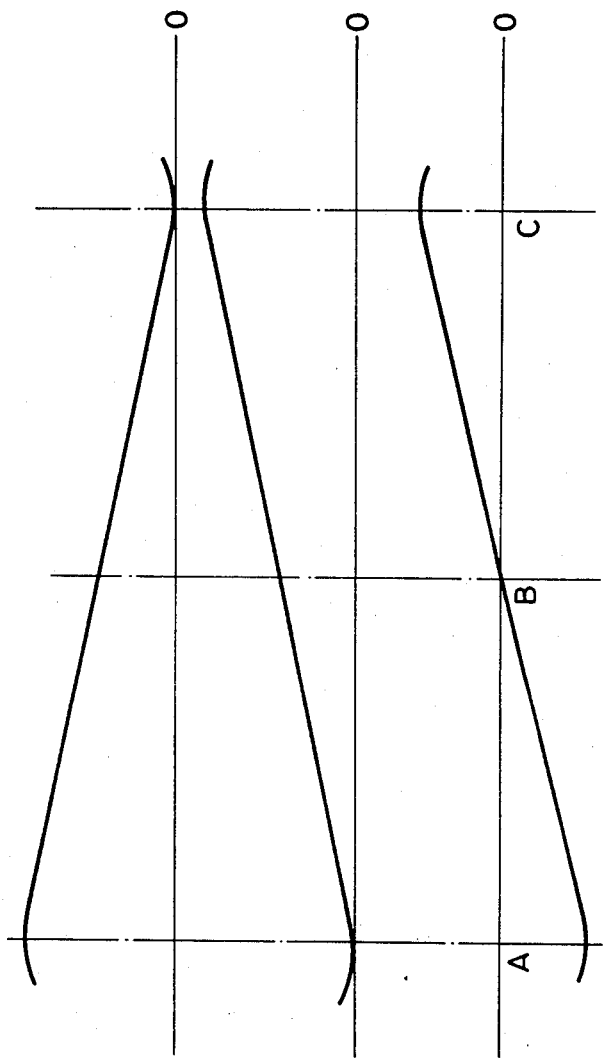

OPTICAL INFORMATION READING APPARATUS

BACKGROUND OF THE INVENTION

The present invention relates to an optical information reading apparatus, and more particularly to an optical information reading apparatus having a servo system for maintaining the perpendicularity between the optical axis of a light beam used for reading recorded information and the plane of the recording medium.

If the angle between the optical axis of a light beam used for reading recorded information and the plane of a recording disk forming the recording medium is offset from a right angle, information can "leak" from an adjacent recorded track to produce cross talk. There are various reasons why this angle may become offset from a right angle. For example, offset may be caused because of deformation of the recorded disk due to aging or because of a slant of the axis around which the disk is rotated due to deformation of the deck portion of the reproducing apparatus. In any event, the generation of cross talk cannot be avoided by the manufacturer of the reproducing apparatus because all of the causes therefore arise after the product has been shipped.

Accordingly, there has been provided a servo system for electrically detecting such cross talk to accurately maintain the perpendicularity between the recorded disk and the optical axis of the reading light beam to thereby reduce the amount of cross talk. Such a technique is disclosed in detail in Japanese Laid-Open Patent Application No. 186,237/1982. In this example, the technique is applied to a reproducing apparatus for a recorded disk which has been recorded using a constant linear velocity (CLV) process. Cross talk is detected using the fact that, when cross talk is present, the synchronizing signal sections of the disk are not arranged on the same radial lines over the entire recorded track in the CLV system. (They are arranged on the same radial line over the entire recorded track in a constant angular velocity (CAV) system.) That is, the leakage component of the synchronizing signal information on adjacent tracks in the CLV system is detected to detect the amount of cross talk, and the angular orientation of the optical axis of the information reading light beam is controlled so as to make the amount of cross talk zero.

Such a system has disadvantages, however, in that the circuit for detecting cross talk is complicated and expensive, and in that the system can be applied only to a CLV system and not to a CAV system.

Another technique is disclosed in Japanese Laid-Open Patent application No. 179,954/1982. FIG. 1 shows the outline of the system described therein, which includes an objective lens 3 for focusing a reading light beam having an optical axis 1 onto a recording plane 2. Further, there is provided an auxiliary beam light source 4 for detecting the amount of offset in perpendicularity between the optical axis 1 and the plane 2. The auxiliary beam is directed onto the recording plane 2 through the objective lens 3. The resulting reflected light passes through the objective lens 3 again and strikes a pair of light detecting elements 5 and 6. If the recording plane 2 is perpendicular to the optical axis, the auxiliary beam is reflected symmetrically with respect to the optical axis to return to a position symmetric to the light source 4 with respect to the optical axis 1, as shown by a solid line in FIG. 1. If the recording plane 2 is inclined as shown by the one-dot chain line or broken line, the position of the returned portion of the auxiliary beam is offset in the direction of the one-dot chain line or the broken line.

The outputs of the light-detecting elements 5 and 6 are applied to a differential amplifier 7 which produces a detection output. The detection output is differenced with a reference signal 9 by a subtractor 8 and the result applied to drive an optical axis tilt control mechanism 10 to thereby maintain the perpendicularity between the optical axis and the recording plane.

Due to the presence of the auxiliary beam, this technique has specific drawbacks:

First, since a servo system (hereinafter referred to as a tilt servo) for maintaining the optical axis 1 of the record information reading light beam perpendicular to the recording plane cannot be operated until the focus servo system of the apparatus has stabilized, the operation of the tilt servo system is slow. In extreme cases, neither tilt servo nor focus servo lock-in can be effected. That is, in order to maintain the auxiliary beam parallel to the optical axis 1 and hence to be reflected to correct positions on the light-detecting elements 5 and 6, the disk plane must be at the focus of the lens. The position of the reflected light from the auxiliary beam will be incorrect if the disk plane deviates significantly from the focus plane. In such a case, an erroneous output is produced from the differential amplifier 7, resulting in inaccurate control of the angle of the optical axis 1.

Accordingly, in the case where the optical axis is set at an incorrect angle, the position of the reflected information-bearing beam on a detector (not shown) used for supplying a control signal to the focus servo or the tracking servo changes so that an unwanted dc component is superposed on the error signal used in the servo system.

Further, since the pickup must be small in size, it is difficult to mount the optical system for the tilt servo in the pickup. To do so generally requires the viewing angle of the objective lens to be narrowed.

An object of the present invention is to provide an optical information reading apparatus of a very simple arrangement in which the perpendicularity between the recording plane and the optical axis of the reading light beam can be detected independently of the operation of the focus servo system.

SUMMARY OF THE INVENTION

According to the present invention, an optical information reading apparatus is provided which includes a tilt servo system in which the amount of offset in the perpendicularity between the recording plane and the optical axis of the recorded information reading light beam is detected and angular positioning means controls the orientation of the optical axis in accordance with the detected offset to thereby maintain the perpendicularity, the apparatus being characterized in that the means for detecting the offset of perpendicularity is constituted by light-emitting means for providing a beam of light directed onto the recording plane and light-detecting means for detecting light from the light-emitting means reflected from the recording plane, wherein the light-emitting means and the light-detecting means are disposed such that the emitted and reflected light do not pass through the lens used for focusing the recorded information reading light beam.

BRIEF DESCRIPTION OF THE DRAWINGS

FIGS. 5(a) to 7(c) are diagrams used for explaining the detecting operation of the tilt detection portion of the apparatus of FIG. 2.

DESCRIPTION OF THE PREFERRED EMBODIMENTS

Figure 1:
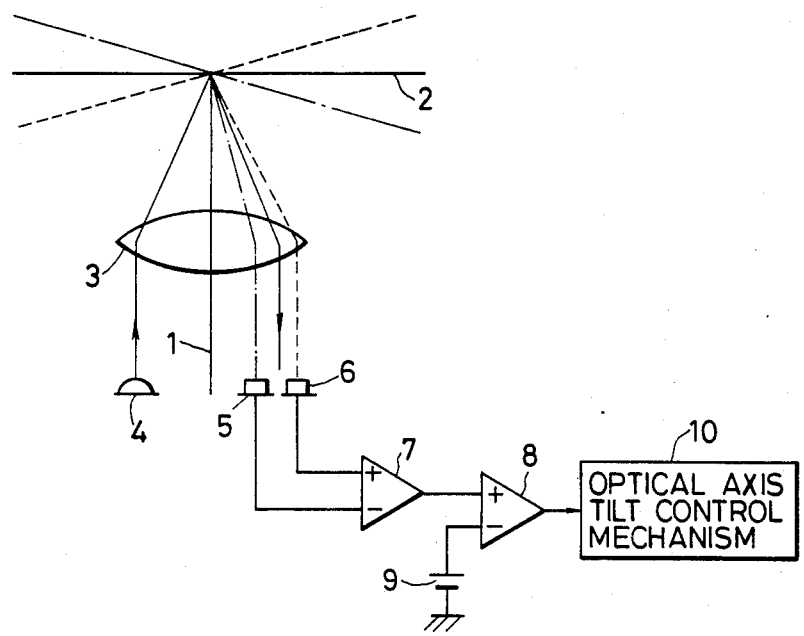
FIG. 1 is a diagram used for explaining the operation of a conventional tilt detection device.

Referring to the drawings, the present invention will now be described in detail.

Figure 2:
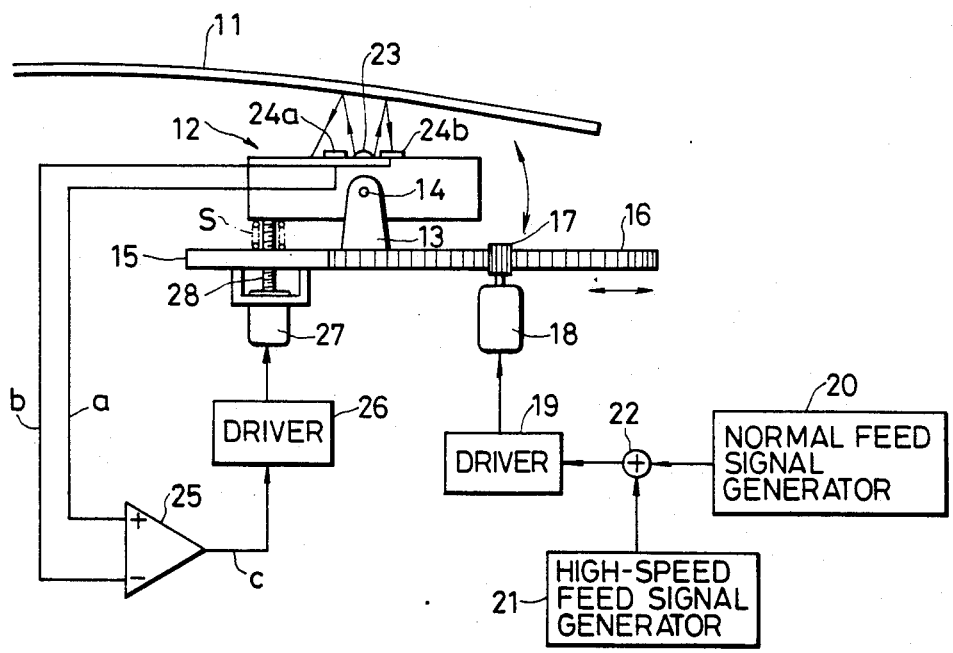
FIG. 2 is a schematic diagram of a first preferred embodiment of the present invention.

FIG. 2 is a diagram showing a preferred embodiment of an optical information reading apparatus of the present invention. In this figure, a recorded disk 11 is illustrated which is slanted relative to a horizontal plane due to deformation. An optical head unit 12 is provided for optically reading the recorded information from the disk, the optical head unit 12 being rotatably supported at a pivotal axis 14 by a support member 13. The support member 13 is fixed to a slider 15 for displacing the head unit 12 in the radial direction of the disk 11. For this purpose, a pinion gear 17 engages a rack 16 formed as part of the slider 15, and the slider 15 is controlled to move in the radial direction of the disk by a drive force transmitted through the pinion gear 17, which in turn is driven by a slider motor 18.

A normal feed signal generator 20 detects a DC component contained in an error signal from a tracking error signal generator (not shown) to produce a normal slider-feed signal. A high-speed feed signal generator 21 produces a high-speed slider-feed signal during operations such as recorded information address retrieval and scanning. The respective outputs of the signal generators 20 and 21 are supplied to a driver 19 through an adder 22 to drive the slider motor 19.

A light-emitting element 23 and light-detecting elements 24a and 24b mounted on the optical head unit 12 detect the slant angle of the disk 11. The respective outputs of the light-detecting elements 24a and 24b are applied to inputs of a differential amplifier 25, the differential output c of which drives a tilt motor 27 through a driver 26. A male thread portion 28 of the rotary shaft of the tilt motor 7 and a female thread portion formed as a part of the optical head unit 12 are threadedly engaged so that the slant angle of the optical head unit 12 can be set by rotation of the motor 27. The pivotal axis 14 of the support member 13 is at the apex of the slant angle. A spring S is provided around the male thread portion 28 to prevent backlash.

Figure 3:
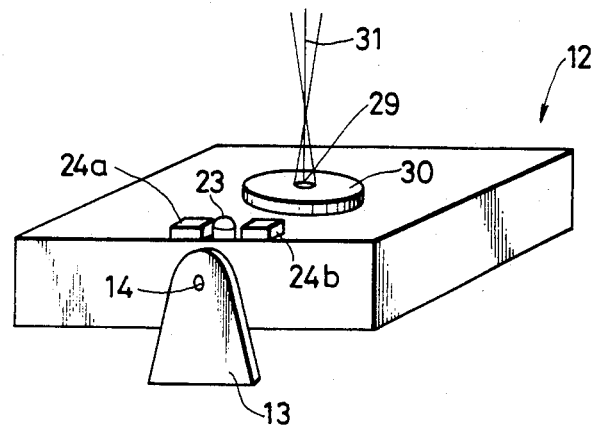
FIG. 3 is a perspective view of the optical head unit of FIG. 2.

FIG. 3 is a perspective view of the optical head unit 12, which includes an objective lens 29. The reading light beam emitted from a laser source in the optical head unit 12 is focused onto the recording plane of the disk 11 through this objective lens. The center of the objective lens 29 is disposed at the position where the optical axis 31 of the light beam and the pivotal axis 14 intersect. In order to control the displacement of the objective lens 29 in the direction parallel to the optical axis 31 so as to maintain the focus of the light beam on the recording plane, a focus actuator 30 is provided which is constituted by a magnetic circuit, a coil, etc.

A straight line passing through the respective centers of the objective lens 29 and the light-emitting element 23 is substantially parallel to the tangential direction of the recording track being read. Preferably, the light-emitting element 23 is disposed such that the beam it emits strikes the recording plane at a point ahead of the focus point of the reading light beam, that is the information detection point, during the information reading operation, and that the beam emitted by the light-emitting element 23 and the reflected light thereof do not pass through the objective lens 29.

The optical axis 31 of the reading light beam and the optical axis of the light beam emitted from the light-emitting element 23 are parallel and may even be aligned with one another so long as the above conditions are met.

Figure 4A:
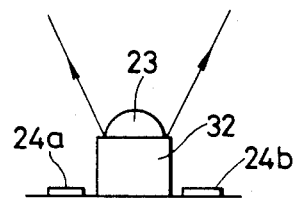
FIGS. 4(a) and 4(b) shows further embodiments of a tilt detector according to the present invention.
Figure 4B:
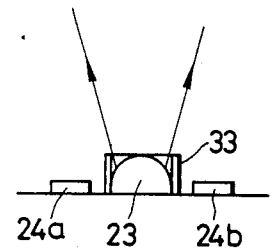

FIGS. 4(a) and 4(b) show in detail the arrangement of the light-emitting element 23 and the light-detecting elements 24a and 24b. In FIG. 4(a), the light-emitting element 23 is mounted on a base 32 so as to raise the position of the light source and thus prevent the light emitted therefrom from impinging directly on the light-detecting elements 24a and 24b, while in FIG. 4(b), all elements are arranged in the same plane and a cylindrical light shielding member 33 is provided around the light-emitting element 23 to prevent the emitted light from impinging directly on the light-detecting elements. Either one of the arrangements of FIGS. 4(a) and (b) may be used.

Referring now to FIGS. 5(a) through 7(c), the operation of the above-described preferred embodiments of the present invention will be described. FIGS. 5(a) through 5(c) show various states of reflection of the beam emitted from the light-emitting element 23 for corresponding slant angles of the disk, and FIGS. 6(a) through 6(c) show the states of reflection viewed from the disk side. FIGS. 7(a) through 7(c) show the states of the outputs a and b of the light-detecting elements 24a and 24b and the output c of the differential amplifier 25 as the slant angle of the disk is varied, in which FIGS. 7(a) and 7(b) show the respective outputs of the light-detecting elements 24a and 24b, and FIG. 7(c) shows the output of the light-detecting element 23. The points A, B and C in FIGS. 7(a) through 7(c) correspond to the states of FIGS. 5(a) through 5(c), respectively, and FIGS. 6(a) through 6(c), respectively, with the point B indicating the case where the disk is horizontal and the disk and the optical axis 31 are perpendicular to each other.

When perpendicularly is established, the beam from the light-emitting element 23 is reflected from the plane of the disk 11 while diverging, uniformly illuminating the light-detecting elements 24a and 24b. Accordingly, the respective output levels of the elements 24a and 24b are equal, and the output level of the differential amplifier 25 is therefore zero. On the other hand, if the disk 11 is deformed as shown in FIG. 5(a) or 5(c), the angle between the disk and the optical axis 31 becomes offset from the perpendicular. For example, in the case of FIG. 5(a), the reflected light impinges only on the light-detecting element 24a so that the output level of the light-detecting element 24a becomes a maximum while the output level of the light-detecting element 24b is substantially zero. Accordingly, the output level of the differential amplifier 25 becomes a maximum in the positive direction. Further, in the case of FIG. 5(c), the reflected light impinges only on the light-detecting element 24b so that the output level of the differential amplifier 25 becomes a maximum in the negative direction for that case.

Accordingly, at the output c of the differential amplifier 25, a signal is provided having a level and polarity which changes in accordance with the amount of offset from perpendicularity between the disk and the optical axis 31 and the direction thereof. If a closed-loop tilt servo system is provided in which the differential output c is always forced toward zero, the optical axis 31 of the light beam will be maintained perpendicular with respect to the disk 11, thereby eliminating cross talk. Further, if the light beam from the light-emitting element 23 has an intensity distribution such as a Gaussian distribution or the like, the gradient of the output characteristic of the differential amplifier 25 is made large to make the detection sensitivity large, thereby facilitating the selection of the size and arrangement of the light-detecting elements 24a and 24b.

In response to the differential output of the differential amplifier 25, the tilt motor 27 is driven so that the optical head unit 12 rotates about the pivotal axis 14 to achieve tilt servo.

FIGS. 8 to 12 show other embodiments of the present invention. Components not specifically shown therein are the same as those in the previously described embodiments. Like components are identified by like reference numerals.

Figure 8:
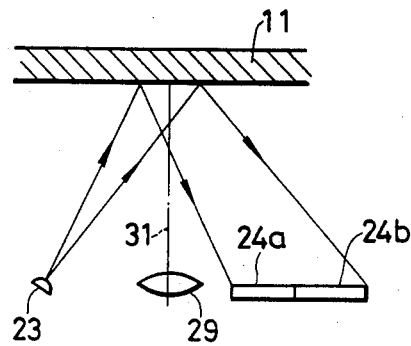
FIGS. 8 to 13 are diagrams showing portions of still further embodiments of the present invention.
Figure 9:
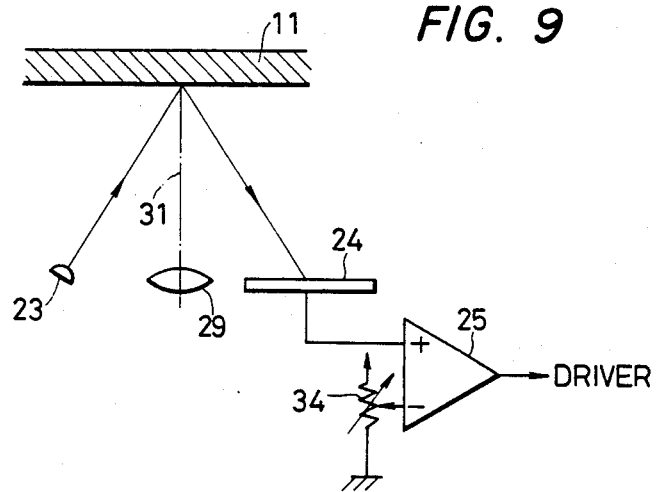

In the modifications of FIGS. 8 and 9, the optical axis 31 of the reading light beam is not parallel to the optical axis of the light-emitting element 23 and the optical axis of the light-emitting element 23 intersects the disk in the vicinity of the information detection point on the disk 11. Accordingly, the light-detecting elements 24a and 24b in FIG. 8 or the light-detecting element 24 in FIG. 9 are separated by some distance from the light-emitting element 23. Preferably, the optical axis of the light-emitting element 23 is made to intersect the optical axis 31 at the information detection point on the disk. In this case, the light-detecting elements and the light-emitting element 23 are disposed at substantially symmetrical positions with respect to the optical axis 31.

In the embodiment of FIG. 8, the two light-detecting elements 24a and 24b are disposed close to one another, which arrangement results in lower light losses. In the modification of FIG. 9, the light-emitting element 23 emits a substantially parallel luminous flux. A single light-detecting element 24 is provided which is a so-called linear position detector or linear sensor, the output of which changes in accordance ewith the reflected light flux impinging position on the light receiving surface thereof. In this embodiment, the output of the light-detecting element 24 is compared with an adjustable reference voltage 34 by the differential amplifier 25, and the output difference signal is supplied to the tilt driver 26 (see FIG. 2). The reference voltage 34 is adjusted so as to be equal to the light-detecting output level when the reflected light strikes the optimum position on the light-receiving surface of the light-detecting element 24.

Figure 10:
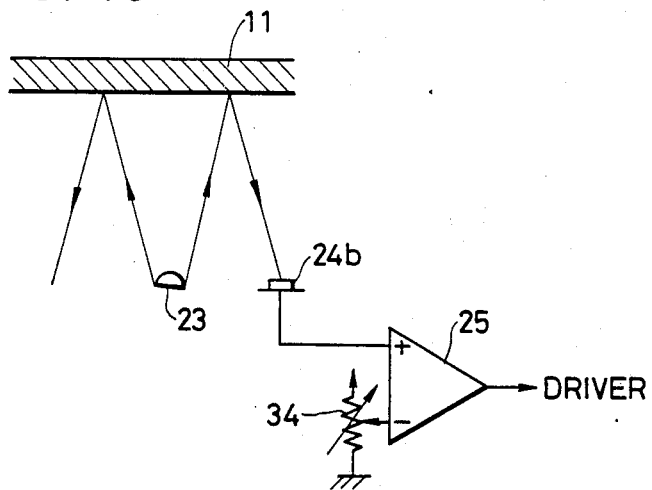

In the embodiment of FIG. 10, a detection signal is obtained using the output of one of the light-detecting elements 24a and 24b, for example, the element 24b, in the embodiment of FIGS. 2 and 3. That is, the light-detecting elements and other components are such that when the flux of the reflected light covers substantially one-half the light-receiving surface of the light-detecting element 24, the differential output supplied to the tilt driver 26 is substantially zero. Thus, this embodiment can be employed to reduce the number of light-detecting elements.

Figure 11:
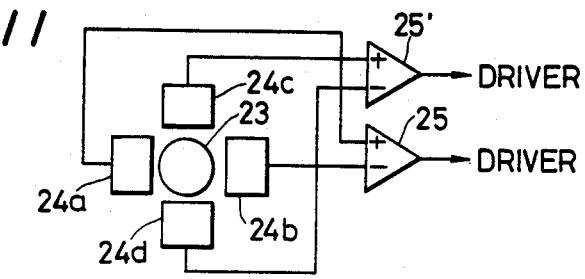

In the modification of FIG. 11, in addition to the pair of light-detecting elements 24a and 24b, a further pair of light-detecting elements 24c and 24d is disposed around a light-emitting element 23, and the respective outputs of the additional pair of light-detecting elements 24c and 24d are applied to an additional differential amplifier 25 to obtain a differential output which is used as a drive signal for an additional tilt servo motor (not shown). With this additional tilt servo motor, the optical axis 31 can be tilted in a plane which is perpendicular to the disk 11 and parallel to the recording track, thereby constituting a second tilt servo system.

Figure 12:
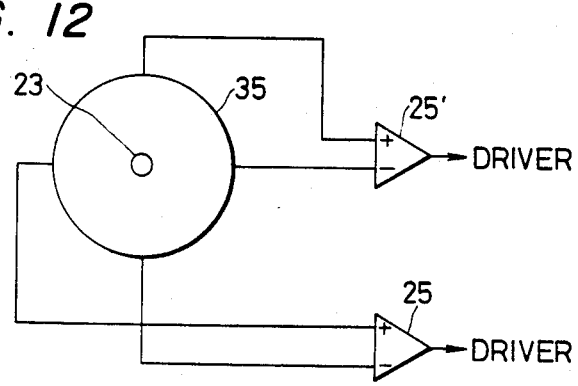

In the modification of FIG. 12, instead of the four light-detecting elements 24a through 24d used in the embodiment of FIG. 11, a two-dimensional position detector 35 is provided which surrounds the light-emitting element 23 (which emits a parallel luminous flux) to detect two-dimensionally the amount of offset from perpendicularity between the disk and the optical axis 31. This two-dimensional position detector 35 is arranged so as to produce signals corresponding to the position of impingement of the reflected light from the luminous flux from the light-emitting element 23, that is, two outputs as vector components in an orthogonal coordinate system constituted by the direction perpendicular to the recording track and the tangential direction of the recording track.

In the embodiments of FIGS. 11 and 12, it is possible to correct an offset from perpendicularity between the disk 11 and the optical axis 31 by two-dimensionally detecting the offset. In this case, a more accurate tilt servo operation can be realized, making it possible to yet more effectively reduce the amount of cross talk.

Figure 13:
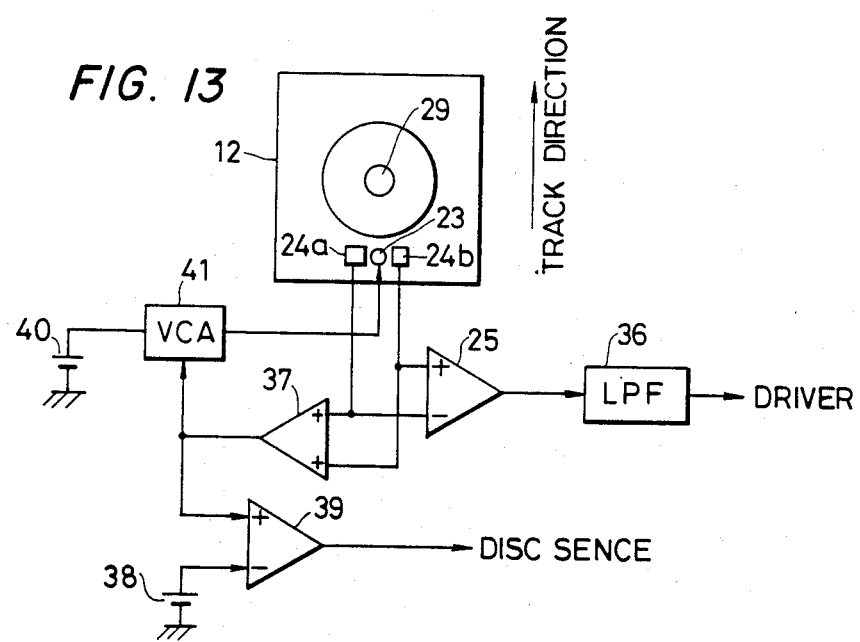

FIG. 13 shows a part of still another embodiment of the present invention, in which components common to the previously described embodiments are designated by the same reference numerals as used in FIGS. 2 and 3. A first feature of this embodiment is that a low-pass filter (LPF) 36 is inserted in the output circuit of the differential amplifier 25 to produce an error signal for the tilt servo system with the tilt motor being driven by the output of the LPF 36. The reason for providing the LPF 36 is that the output of the differential amplifier 25 contains components of relatively high frequency (10 to 30 Hz), which generally have an amplitude proportional to the frequency of disk rotation and which are produced by the vibration of the plane of the disk 11. Such components cause a drive current to continuously flow in the tilt motor, resulting in a high electric power consumption and in a high operating temperature of the motor. This is particularly the case where a tilt motor which has a relatively slow response time is employed.

According to this embodiment of the present invention, such unnecessary high frequency components are eliminated by the LPF 36 to thus reduce the power consumption and the temperature of the motor. It is necessary to set the cut-off frequency of the LPF 36 to such a value that tilt control can still be sufficiently effected when a high-speed feed signal is supplied to the slider driver 19 (see FIG. 2). Hence, the actual cut-off frequency should be determined in accordance with the maximum feeding speed of the slider.

A second feature of this embodiment is that the outputs of the light-detecting elements 24a and 24b are used for another purpose in addition to their use as tilt servo error signals. Generally, in an optical information reading apparatus, a focus servo system for accurately positioning the information detection point on a recording track, a tracking servo system, a laser on/off control device, etc., are allowed to start their operations only after confirmation of the fact that the disk has been put in its predetermined playing position. Accordingly, it is necessary to provide a disk sensor circuit. In accordance with this embodiment, the outputs of the light-detecting elements 24a and 24b are used for this purpose.

That is, the respective outputs of the light-detecting elements 24a and 24b are added by an adder 37, and the addition output from the adder 37 is compared with a reference level 38 by a comparator 39. The comparison output from the comparator 39 is used as a disk sensing signal. Since the output of the adder 37 is substantially zero when no disk is present, it is possible to determine whether or not a disk is present by comparing the output of the adder 37 with the reference level 38.

A third feature of this embodiment of the present invention is that the amplitude of the light emitted by the light-emitting element 23 is automatically adjusted such that the sum of the amount of reflected light impinging on the light-detecting elements 24a and 24b is made substantially constant. To this end, the output of the adder 37 is used as a gain control signal for a voltage-gain control amplifier (VCA) 41 provided between the light-emitting element 23 and a voltage source 40 used for energizing the light-emitting element 23.

In this manner, any reduction in the amount of light reflected due to smudges on the disk or a deterioration in the output of the light-emitting element 23 is compensated for to make the amount of light reflected always substantially constant. It is preferable to make the time constant of the adder 37 or the VCA 41 large to eliminate high frequency components arising due to disk plane vibration or the like. Thus, a possible deterioration in the response characteristic due to a lack of amplitude of the error signal supplied to the tilt driver 26 is prevented. Further, light output control can be performed by using the output of either one of the light-detecting elements.

As described above, according to the present invention, accurate tilt servo control is realized by a very simple arrangement, providing advantages not only in the elimination of cross talk in a CAV system as well as in a CLV system, but also in other various points. Since the tilt servo error signal, or more specifically, the luminous flux used for generating the tilt detection signal, does not pass through the objective lens, it is possible to effect the operation of the tilt servo system before lock-in of the focus servo is achieved so that the operation of the tilt servo system can be effected immediately after the disk has been mounted. Such servo control can be stably effected even in the case that disk plane is greatly deformed. Further, the tilt servo operation is not affected by the displacement of the objective lens during tracking, and the light-emitting and light-detecting elements for tilt detection can be mounted on the outer circumferential wall of the optical head unit. It is not necessary to provide them inside the optical head unit as in the prior art approach illustrated in FIG. 1, thereby making it possible to reduce the size of the optical head unit.

Further, with the light-detecting elements mounted on the outer circumferential wall of the optical head unit, any offset in perpendicularity between the disk and the optical axis can be accurately detected. Since the light-detecting element and the information detection point are in the vicinity of and above the track being read, there is an advantage in that an offset in perpendicularity between the recording plane and the optical axis of the track is detected and corrected.

Still further, since the light-detecting elements are disposed in the vicinity of the axis of rotation of the optical head unit, the relative distance between the light-detecting elements and the disk is not largely affected by a rotational adjustment of the unit.

Moreover, the electrical power consumption and the operating temperature of the tilt motor are reduced by driving the tilt motor only with low-band components of a tilt error signal, and a reduction in the amount of reflected light is prevented by automatically controlling the supply of electrical power for driving the light-emitting element.

What is claimed is:

1. In an optical information reading apparatus having a servo system in which offset in a relation of perpendicularity between an optical axis of a first light beam used for reading recorded information and which is focused onto a recording medium with a lens and a recording plane of a recording medium is detected and employed by tilt control means for maintaining said relation of perpendicularity, the improvement wherein said means for detecting the offset in said relation of perpendicularity comprises light-emitting means for producing a second light beam directed onto said recording plane, and light-detecting means for detecting light from said light-emitting means reflected from said recording plane and having an output corresponding to a degree of offset in said relation of perpendicularity between said optical axis of said first light beam and said recording plane, said light-emitting means and said light-detecting means being disposed such that said second light beam and said light from said second light beam reflected from said recording plane do not pass through said lens, and said tilt control means is driven in accordance with said output of said light-detecting means.

2. The apparatus according to claim 1, wherein said tilt control means rotates said optical axis about an axis of rotation, and said light-emitting means is disposed proximate said axis of rotation of said optical axis such that a relative distance between said light-decreasing means and said recording medium is substantially unaffected by rotation of said optical axis about said axis of rotation.

3. The apparatus according to claim 1, in which said light-detecting means comprises a single light-detecting element, and further comprising means for driving said tilt control means with a signal corresponding to a difference between said output of said light-detecting element and a predetermined reference voltage.

4. The apparatus according to claim 1, in which said light-detecting means comprises two light-detecting elements disposed such that a difference is produced between respective outputs of said light-detecting elements in accordance with said offset in said relation of perpendicularity, said tilt control means being driven in response to said difference between said outputs.

5. The apparatus according to claim 4, wherein a magnitude of said difference equals zero when said offset in said relation of perpendicularity is zero, and the magnitude of said difference is a maximum when said offset is a maximum.

6. The apparatus according to claim 1, further comprising means for driving said tilt control means in accordance with only a low-band component of said output of said light-detecting means.

7. The apparatus according to claim 1, further comprising means for mounting said light-emitting means and said light-detecting means such that predetermined fixed angles are maintained thereby with said optical axis independently of a tilt angle of said first light beam relative to said recording plane.

8. The apparatus according to claim 1, in which said tilt control means comprises means for maintaining said optical axis of said first light beam in a plane perpendicular to said recording plane and perpendicular to a recording track on said recording medium.

9. The apparatus according to claim 1, in which said tilt control means comprises means for maintaining said optical axis of said first light beam in a plane perpendicular to said recording plane and parallel to a tangential direction of a recording track on said recording medium.

10. The apparatus according to claim 1, further comprising means for supplying operating power to said light-emitting means in an amount such that an amount of light emitted by said light-emitting means is controlled by changes in an amount of light received by said light-detecting means.

* * * * *